United States Patent
Bitoh

(10) Patent No.: US 7,388,304 B2
(45) Date of Patent: Jun. 17, 2008

(54) POWER SUPPLY SYSTEM AND ELECTRONIC DEVICE COMPRISING THE SAME

(75) Inventor: Hiroyasu Bitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 265 days.

(21) Appl. No.: 10/860,416

(22) Filed: Jun. 2, 2004

(65) Prior Publication Data

US 2004/0217652 A1    Nov. 4, 2004

Related U.S. Application Data

(63) Continuation of application No. PCT/JP03/12246, filed on Sep. 25, 2003.

(30) Foreign Application Priority Data

Sep. 30, 2002    (JP) ............................. 2002-286597

(51) Int. Cl.
*H02J 9/00*    (2006.01)
*H01M 8/00*    (2006.01)

(52) U.S. Cl. ........................................ 307/64; 429/12
(58) Field of Classification Search ................. 429/12; 307/64

See application file for complete search history.

(56) References Cited

U.S. PATENT DOCUMENTS

| 6,011,324 | A | * | 1/2000 | Kohlstruck et al. ........... 307/64 |
|---|---|---|---|---|
| 6,198,645 | B1 | | 3/2001 | Kotowski et al. |
| 6,268,077 | B1 | | 7/2001 | Kelley et al. |
| 6,404,075 | B1 | * | 6/2002 | Potter et al. ................... 307/64 |
| 6,447,945 | B1 | | 9/2002 | Streckert et al. |
| 6,602,627 | B2 | * | 8/2003 | Liu et al. ...................... 429/23 |
| 6,653,749 | B2 | * | 11/2003 | Delbridge .................... 307/85 |
| 6,910,138 | B2 | * | 6/2005 | Hayashi et al. ............. 713/300 |
| 7,025,903 | B2 | * | 4/2006 | Grieve et al. ............... 252/373 |
| 7,053,502 | B2 | * | 5/2006 | Aihara et al. ................ 307/46 |
| 7,124,310 | B2 | * | 10/2006 | Hayashi et al. ............. 713/320 |
| 2002/0081468 | A1 | | 6/2002 | Shioya |

FOREIGN PATENT DOCUMENTS

WO    WO 01/89055 A1    11/2001

* cited by examiner

*Primary Examiner*—Michael J Sherry
*Assistant Examiner*—Hal I Kaplan
(74) *Attorney, Agent, or Firm*—Frishauf, Holtz, Goodman & Chick, P.C.

(57) ABSTRACT

A power supply system generates drive power and supplies the drive power to a load. The system includes an electric power generating part having at least a power generation section which has a fuel cell that generates electricity generation power by use of a power generation fuel. An external power supply connection section connects an external power supply supplying externally supplied power. An operation control section includes a section for setting the power generation section in a standby state on the basis of the externally supplied power supplied from the external power supply when at least the external power supply is connected to the external power supply connection section.

36 Claims, 12 Drawing Sheets

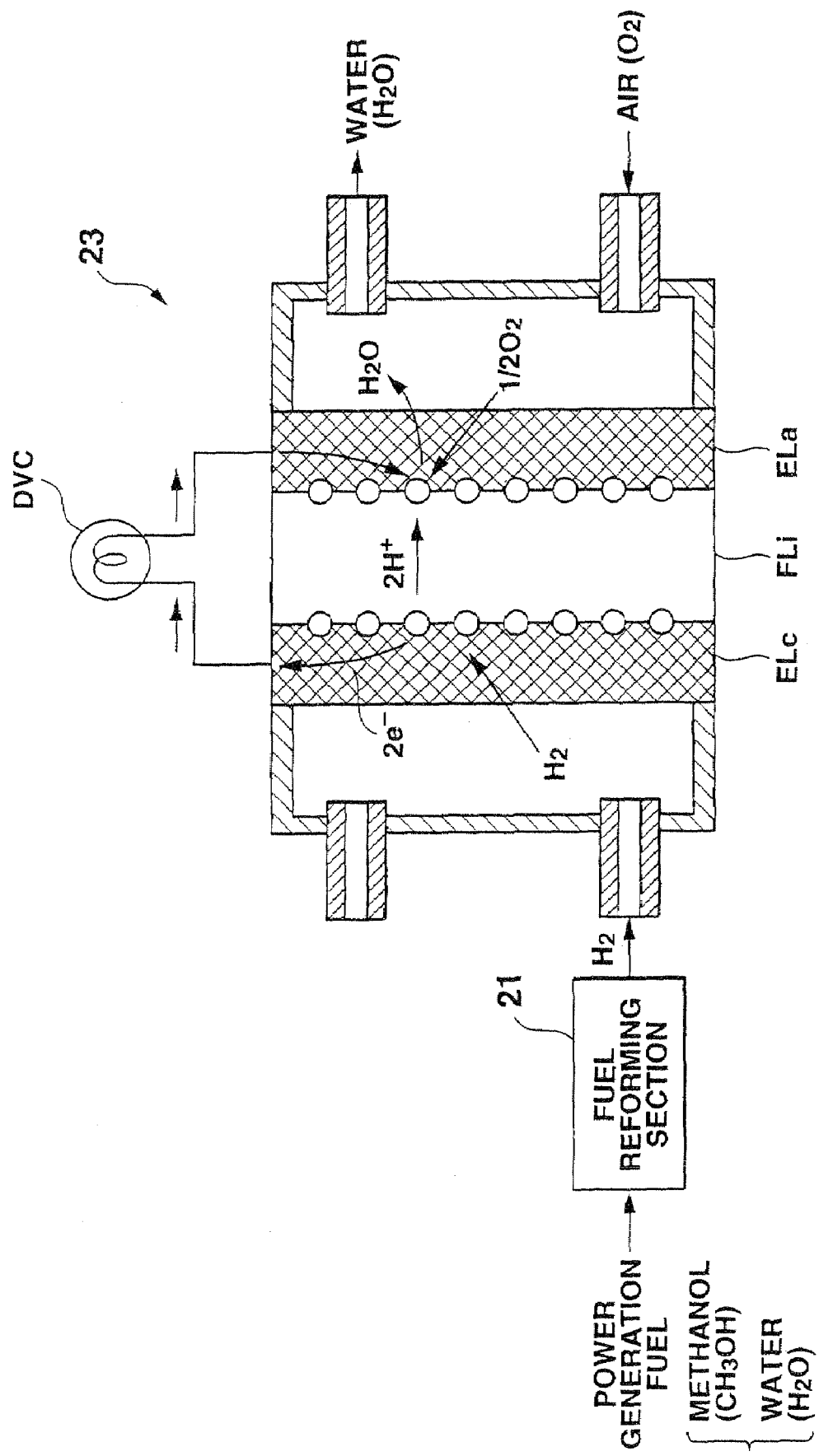

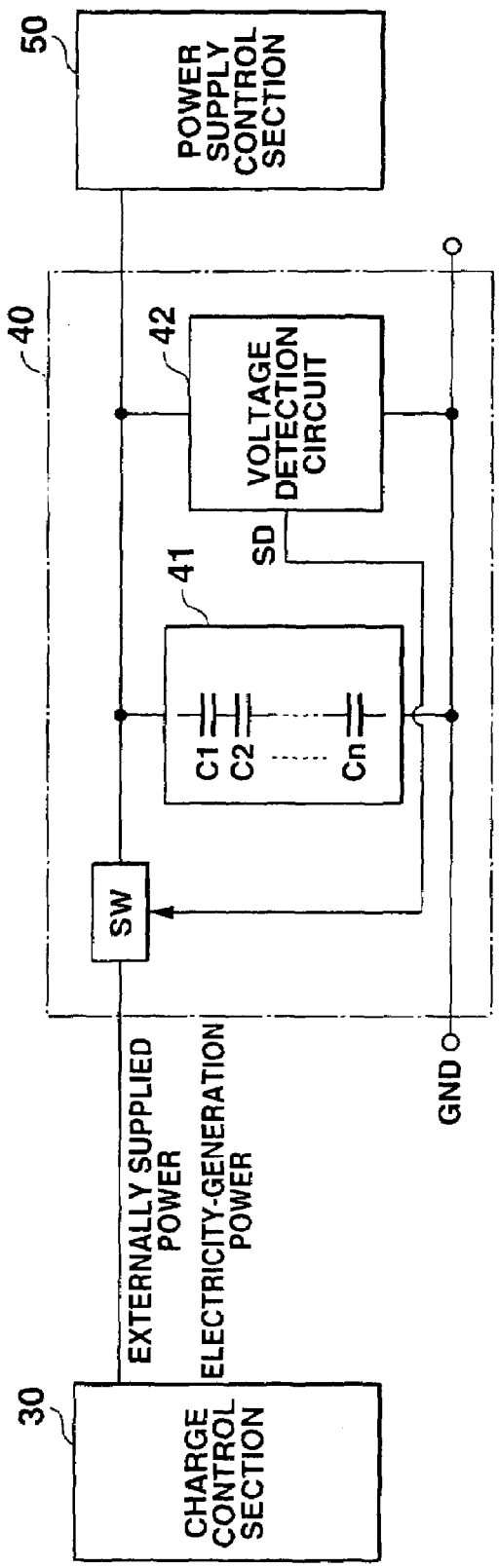
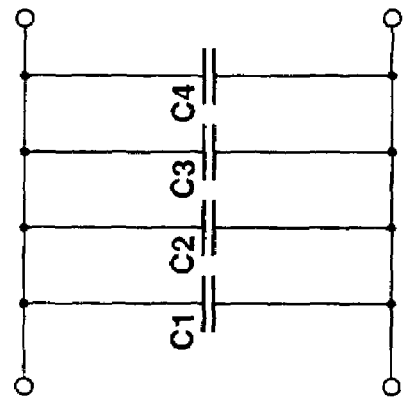
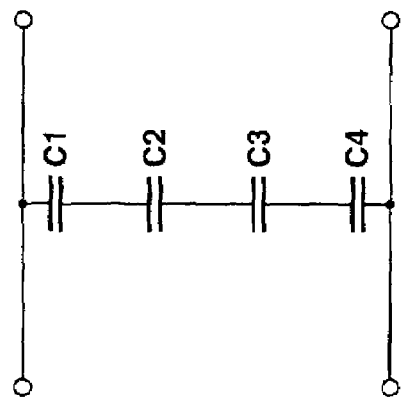
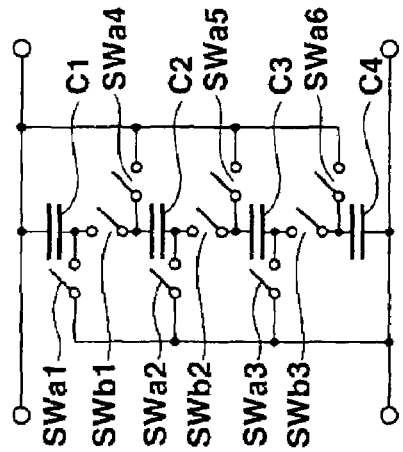

POWER SUPPLY SYSTEM AND ELECTRONIC DEVICE COMPRISING THE SAME

CROSS-REFERENCE TO RELATED APPLICATIONS

This is a Continuation Application of PCT Application No. PCT/JP03/12246, filed Sep. 25, 2003, which was published by the International Bureau on 15 Apr. 2004 (15. 04. 2004) under No. WO 2004/031928.

This application is based upon and claims the benefit of priority from prior Japanese Patent Application No. 2002-286597, filed Sep. 30, 2002, the entire contents of which are incorporated herein by reference.

BACKGROUND OF THE INVENTION

1. Field of the Invention

The present invention relates to a power supply system and an electronic device comprising the power supply system, and more particularly relates to a power supply system which comprises a power generation section capable of generating power by use of a power generation fuel, which can be connected with an external power supply, and which can drive a load with electric power generated by the power generation section or electric power supplied from the external, and to an electronic device which comprises the power supply system and is driven by the power supply system.

2. Description of the Related Art

Recently, research and development have been keenly conducted for practical application and prevalence of fuel cells as a next-generation mainstream power supply system which have a significantly small impact on the environment (environmental burden) and a relatively high power generation efficiency (energy conversion efficiency) of about 30 to 40%, with a growing concern for environmental issues and energy problems.

Such a power generation system using the fuel cell is being put into practical use and commercialized, for example, in an automobile field, as a power supply unit for an electric automobile which applies an electric motor as a driving device instead of a gasoline engine or diesel engine with a heavy environmental burden due to emission of an exhaust gas and the like. As a technique for the fuel cell in a vehicle, such a configuration is known that comprises, for example, an energy battery constituted of a fuel cell which regularly generates constant electric power and a relatively large-sized power battery constituted of a secondary battery such as a lead battery, wherein switch control is carried out: motor driving electric power is supplied from the energy battery in an operating state with a light vehicle-driving load, while motor driving electric power is supplied from the power battery when the driving load is increased.

As described above, the power supply system using the fuel cell has conventionally been developed for application in the electric automobiles and the like which are relatively large-sized, operated continuously for relatively a long time, and are not frequently controlled to start and stop, and such a power supply system has a configuration provided with a relatively large battery for power holding. In such a configuration, the battery is fully charged, for example, through an external power supply such as a commercial alternating current power supply in an initial state of the power supply system (fuel cell) before started, and then the fuel cell is once started with the charged power, thus relatively easily enabling a constantly stable operating state under a usage condition where start/stop controls are not made frequently.

On the other hand, portable devices driven by batteries such as notebook-sized personal computers, digital cameras, personal digital assistances (PDA) and mobile telephones that have been significantly popular in recent years are required to cope with increasing power consumption due to more sophisticated functions, much longer operation time, and the like. One way considered to deal with these requirements is to make the power generation system using the fuel cell as described above smaller and lighter to install it as the power generation unit for those portable devices, and thus research and development for such a purpose are actively conducted. If the power generation system using the fuel cell is to be applied as the power generation unit for such portable devices, problems as indicated below are posed.

When the power generation system using the fuel cell is used for the portable devices and the like, it is difficult to mount a high-capacity large secondary battery and capacitor as batteries for power holding in terms of space and weight, so that a relatively small secondary battery and capacitor have to be used. Therefore, charging capacity of the secondary battery and capacitor becomes small in proportion to their volumes, areas and the like, which makes it difficult to ensure sufficient capacity. Moreover, for example, the portable devices such as the digital cameras and PDA are characterized by their usage in which start and stop operations are relatively frequently performed. Therefore, in a configuration in which charged power is utilized for starting the fuel cell, even if the battery is charged with sufficient electric power in the initial state, the electric power consumed to start the fuel cell might surpass the electric power generated by the fuel cell to supply and charge the battery because of the start and stop operations of the fuel cell that are frequently repeated, and in which case the charging power of the battery is gradually decreased. If the charging power of the battery has decreased below the minimum power required for starting, the fuel cell can not be started, which might cause inconvenience in using the portable devices. Further, if the start and stop operations of the fuel cell are frequently repeated as described above, fuel consumption efficiency of the fuel cell is also lowered because of the relatively large electric power consumed to start the fuel cell.

BRIEF SUMMARY OF THE INVENTION

The present invention provides a power supply system comprising a fuel cell which generates power by use of a power generation fuel, and being capable of using also electric power supplied from an external power supply, and an electronic device comprising the power supply system, wherein an advantage is that even if they are used in a situation where start and stop operations are relatively frequently performed, starting troubles are avoided to provide improved usage of the electronic device, and such an advantage is also provided that consumption of power generation fuel at startup is reduced so as to improve fuel consumption efficiency.

In order to obtain the above advantages, the present invention provides a power supply system which generates drive power and supplies the drive power to a load, and the power supply system comprises an electric power generating section comprising: a power generation section which generates electricity-generation power by use of a power generation fuel; an external power supply connection section which connects an external power supply supplying externally supplied power; and an operation control section which comprises means for setting the power generation section in a standby state on the basis of the externally supplied power supplied from the external power supply when the external power supply is connected to the external power supply connection section, wherein the external power supply is, for example, a commercial alternating current power supply, and power which is supplied from the commercial alternating current power supply and converted to a direct current is supplied as the externally supplied power.

The electric power generating section in the present invention preferably comprises a power supply control section which has means for controlling to generate the drive power and to supply the drive power to the load on the basis of one of the electricity-generation power and the externally supplied power.

Furthermore, the electric power generating section in the present invention preferably comprises a power holding section having, for example, a plurality of capacity elements which holds electric charges corresponding to the power based on the electricity-generation power and the externally supplied power, and which outputs the power based on the held charges as power for generating the drive power, and the electric power generating section comprises means for supplying at least part of the externally supplied power to the power holding section when the external power supply is connected to the external power supply connection section and the externally supplied power is supplied from the external power supply, and supplying at least part of the electricity-generation power to the power holding section when the external power supply is not connected to the external power supply connection section.

Furthermore, the electric power generating section in the present invention preferably comprises a charge control section which controls power to be supplied to the power holding section and the power supply control section on the basis of a supply state of externally supplied power from the external power supply, and the charge control section comprises detection means for detecting that the external power supply is connected to the external power supply connection section, and means for selecting one of the electricity-generation power and the externally supplied power to supply to the power holding section and the power supply control section on the basis of a detection result by the detection means.

Furthermore, the electric power generating section in the present invention preferably comprises a fuel supply control section which controls the supply state of the power generation fuel to the power generation section, and the fuel supply control section comprises at least means for controlling supply and shutoff of the power generation fuel to the power generation section, and the fuel supply control section comprises means for controlling the fuel supply control section to shut off the supply of the power generation fuel to the power generation section when the external power supply is connected to the external power supply is connection section and the externally supplied power is supplied from the external power supply.

Furthermore, the power generation section in the electric power generating section of the present invention preferably comprises at least a fuel cell which generates the electricity-generation power by an electrochemical reaction using the power generation fuel, and the power generation section comprises: at least a fuel reforming section which produces a particular fuel component including hydrogen from the power generation fuel by a predetermined catalytic reaction; and the fuel cell which generates the electricity-generation power by an electrochemical reaction using the particular fuel component, and the power generation section further comprises a fuel vaporizing section which vaporizes the power generation fuel and supplies this to the fuel reforming section, and moreover, the power supply system comprises a power generation control section which sets and controls a generation condition of the electricity-generation power in the fuel cell, and the generation condition is a temperature condition for controlling a proceeding state of the electrochemical reaction in the fuel cell, and the power generation control section comprises means for setting and controlling the temperature condition, and the fuel cell comprises a heater section which sets the temperature condition, and means for setting and controlling the temperature condition in the power generation control section comprises a heater control section which controls setting of the temperature condition by the heater section, and the standby state is a state where the temperature condition is set to a preheat temperature which is equal to or lower than a temperature condition under which the electricity-generation power is generated in the fuel cell, and the heater control section comprises means for setting the temperature condition to the preheat temperature on the basis of the externally supplied power, when the external power supply is connected to the external power supply connection section and the externally supplied power is supplied from the external power supply.

In order to obtain the above advantages, the present invention provides an electronic device, and the electronic device comprises: an electric power generating section which comprises a configuration equivalent to that of the electric power generating section in the above power supply system and which generates drive power by comprising at least a power generation section which generates electricity-generation power by use of a power generation fuel, an external power supply connection section which connects an external power supply supplying externally supplied power, and an operation control section which comprises means for setting the power generation section in a standby state on the basis of the externally supplied power supplied from the external power supply when at least the external power supply is connected to the external power supply connection section; a fuel sealing section in which the power generation fuel is sealed; and a load which is driven by the drive power, wherein the electric power generating section may be configured integrally with the electronic device, and moreover, the fuel sealing section is configured detachably from the electronic device, and the electronic device may comprise at least an interface section having means for physically detachably combining the fuel sealing section with the electric power generating section, and for supplying the power generation fuel sealed in the fuel sealing section to the electric power generating section. In addition, the operation control section may be provided in the electronic device, and serve also as a load drive control section which controls at least a driving state of the load.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a schematic configuration diagram showing one configuration example of a fuel cell main unit applicable to the power generation section according to the present embodiment;

FIGS. 7A to 7D are block diagrams showing one configuration example of a power holding section applied to an electric power generating part according to the present embodiment;

DETAILED DESCRIPTION OF THE INVENTION

Figure 1A:
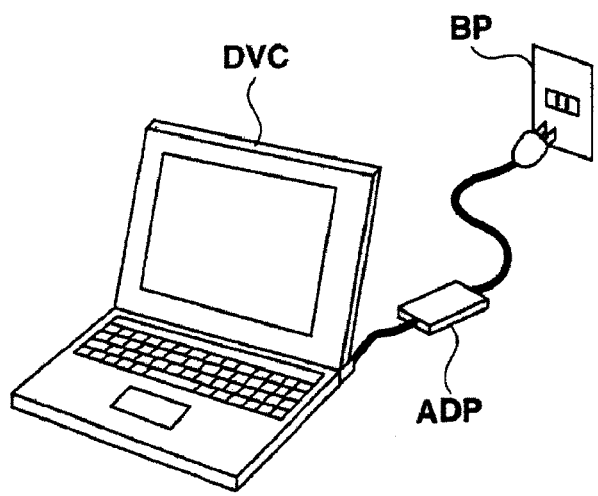
FIG. 1A to 1D are schematic configuration views showing examples of electronic devices each comprising a power supply system according to the present invention.

A power supply system, its drive control method and an electronic device comprising the power supply system according to the present invention will hereinafter be described with reference to an embodiment illustrated in the drawings.

<Electronic Device Comprising the Power Supply System>

First, a configuration of the electronic device to which the power supply system according to the present invention is applied will be described with reference to the drawings.

Figure 1B:
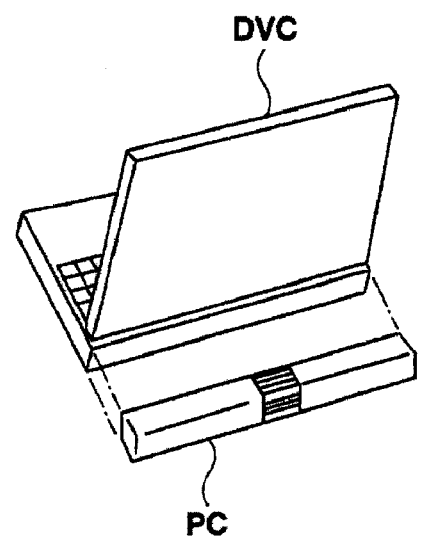
Figure 1C:
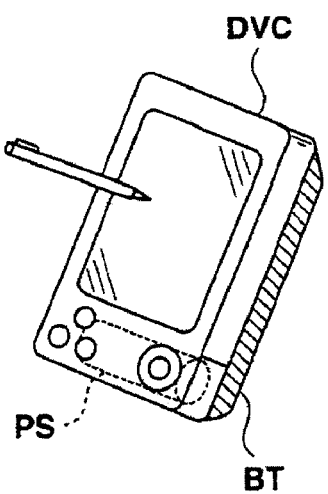
Figure 1D:
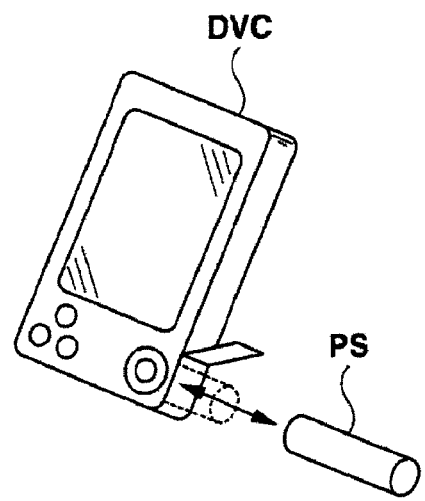
Figure 2:
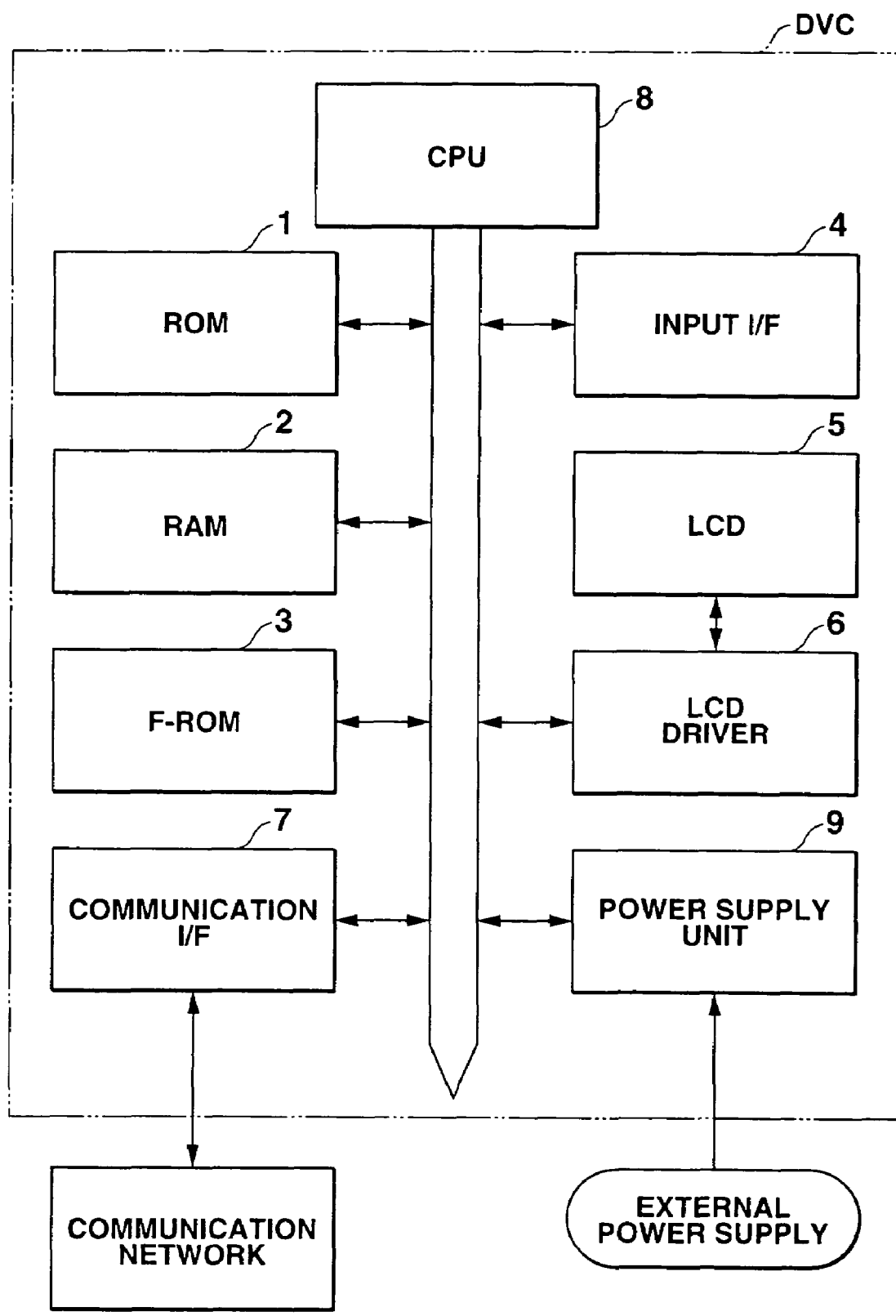
FIG. 2 is a schematic block diagram showing an internal configuration of the electronic device according to an embodiment of the present invention.

FIGS. 1A to 1D are schematic configuration views showing examples of electronic devices each comprising the power supply system according to the present invention, and FIG. 2 is a schematic block diagram showing an internal configuration of the electronic device according to the embodiment of the present invention.

In the electronic device comprising the power supply system according to the present invention, for example, the power supply system is modularized as a power supply unit which replaces an existing internal battery, multipurpose battery or the like, and has a configuration in which a whole or part of which is integrally built in an electronic device (hereinafter generically named "device") DVC, as shown in FIGS. 1A to 1D.

These devices DVC comprise connection portions to an external power supply such as a commercial alternating current power supply BP for general households, external battery BT and power supply for a vehicle, and are configured to be able to operate also with predetermined power supplied from the external power supply (externally supplied power) by connecting with the external power supply.

For example, in a room or a vehicle, the devices can be used by being connected to the external power supply and driven. Here, the device DVC is supplied with the power constituted of a predetermined D.C. voltage and current which is converted via an AC-DC adapter (so-called AC adapter) ADP when the commercial alternating current power supply is used as the external power supply in the room, and via DC-DC adapter (so-called car adapter) when the vehicle power supply is used as the external power supply in the vehicle.

Here, FIGS. 1A and 1B show a notebook-sized personal computer as the device DVC, and it is configured so that, for example, a fuel package PC (described later in detail) in which a fuel to generate power used for power generation operation in the power supply system according to the present invention is sealed is formed detachably from a device DVC main unit (power supply system).

Furthermore, FIGS. 1C and 1D show a personal digital assistant as the device DVC, wherein the entire power supply system PS has, for example, a configuration equivalent to that of a multipurpose secondary battery and is formed in a manner that it can be optionally attached to and detached from the device DVC main unit.

As schematically shown in FIG. 2, an internal configuration of the device to which the power supply system as described above is applied comprises a ROM 1 which fixedly stores components (hereinafter noted as functional sections) for achieving functions intrinsic to the device, that is, a control program and various kinds of data for control; storage means such as a RAM 2 and a flash memory (F-ROM) 3 which temporarily store various kinds of processing data generated during execution of the control program; an input interface (input I/F) 4 such as a touch panel, pointing device and mouse; display output means such as a liquid crystal display panel (LCD) 5 and an LCD driver 6; a communication interface (communication I/F) 7 which enable connection of the device DVC to a communication network or the like; a computing device (CPU) 8 which controls those input/output means, storage means, etc in accordance with the control program; and a power supply unit 9 which supplies operation power to each component inside the device DVC. The power supply unit here constitutes the power supply system according to the present invention, and generates the operation power (drive power) described above on the basis of the power generated by power generation operation using the fuel for power generation or of the externally supplied power supplied from the external power supply, which is supplied to each functional section component inside the device DVC.

<Power Supply System>

Next, the power supply system applied to the power supply unit of the device DVC described above will be specifically described in reference to the drawings.

Figure 3:
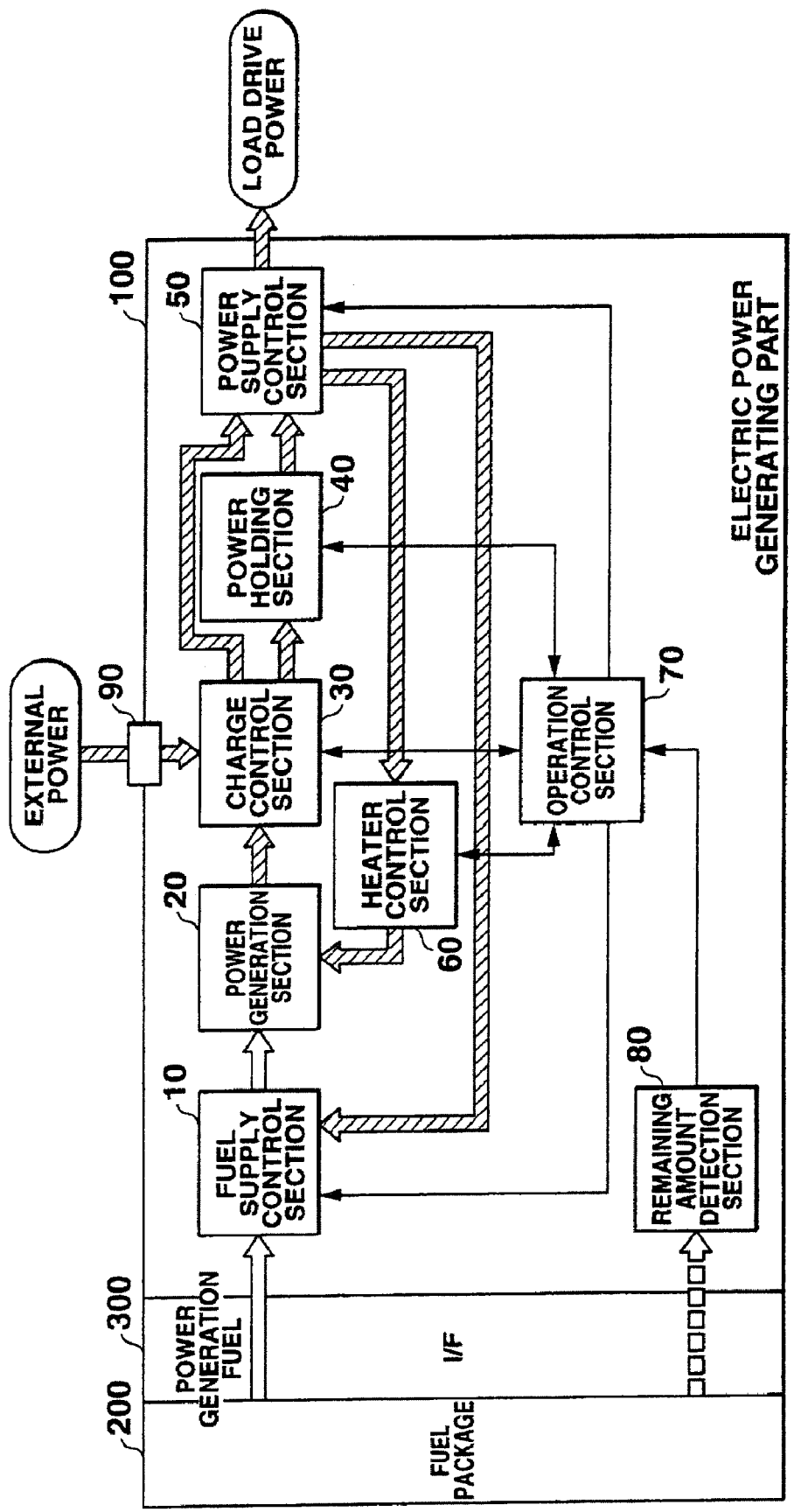
FIG. 3 is a schematic block diagram showing one embodiment of the power supply system according to the present invention.

FIG. 3 is a schematic block diagram showing one embodiment of the power supply system according to the present invention.

As shown in FIG. 3, the power supply system according to the present embodiment mainly has a fuel package (fuel sealing section) 200 in which the power generation fuel comprising a liquid fuel, liquefied fuel or gas fuel is sealed; an electric power generating part 100 which generates and outputs the drive power on the basis of at least the power generation fuel supplied from the fuel package 200; and an interface section (hereinafter abbreviated to "I/F section") 300 which physically combines the fuel package 200 with the electric power generating part 100. The section 300 comprises a fuel sending path or the like for supplying the power generation fuel sealed in the fuel package 200 to the electric power generating part 100, and those components are structured in such a manner that they can be combined and separated (attached and detached) mutually or in an optional form, or those components are integrally structured.

The electric power generating part 100 according to the present embodiment comprises components as follows. A power generation section (power generation means) 20 generates predetermined power (electricity generation power) by use of the power generation fuel supplied from the fuel package 200 via the I/F section 300. A fuel supply control section (fuel supply control means) 10 controls a supply state of the power generation fuel sealed in the fuel package 200 to the power generation section 20. An external power supply connection section (external power supply connection means) 90 electrically connects to the external power supply such as the commercial alternating current power supply provided outside the power supply system (electric power generating part). A power holding section (power holding means) 40 once holds power based on the power (electricity generation power) generated in the power generation section 20 or the externally supplied power supplied from the external power supply and then continuously outputs the held power. A power supply control section (power supply control means) 50 converts a voltage output from the power holding section 40 or a voltage of the externally supplied power supplied from the external power supply to a predetermined voltage suitable for driving the device DVC to which the power supply system is connected, so as to supply it as drive power thereto. A charge control section (charge control means) 30 controls an operation of supplying the selected power to the power holding section 40 and the power supply control section (power supply control means) 50 so as to charge the power holding section 40 with the supplied power, by selecting one of the power (electricity generation power) generated by the power generation section 20 and the externally supplied power supplied from the external power supply connected to the external power supply connection section 90 on the basis of whether the external power supply is connected, that is, whether externally supplied power is supplied from the external power supply and an operation of supplying the drive power to a load connected to the power supply system, that is, each function section of the device DVC. A heater control section (power generation control section) 60 controls the supply state of heater power supplied to a heater section that is provided in the power generation section 20 so as to control and set a temperature condition in the power generation section. An operation control section (operation control means) 70 controls an overall operation of the power supply system such as start/stop of the power generation operation in the power generation section 20, control of the power supplied to the power holding section 40, and control of the power supplied to the load, in accordance with whether or not the external power supply is connected to the external power supply connection section 90. A remaining amount detection section 80 detects the remaining amount of power generation fuel sealed in the fuel package 200.

Hereafter each component will specifically be described.

(Fuel Supply Control Section)

The fuel supply control section 10 has a function as a fuel supply pump which transports the power generation fuel sealed in the fuel package 200 to the power generation section 20 via the I/F section 300, on the basis of a control signal from the operation control section 70.

The fuel supply control section 10 here has a function of controlling the supply state of the power generation fuel to the power generation section 20, that is, an amount of supplied/shutoff power generation fuel, on the basis of the control signal. In this way, a power generation state in the power generation section 20, that is, start and stop of the power generation section 20 and an amount of electricity generation power in the power generation section 20 are directly controlled.

Especially in a state where the power supply system is connected to the external power supply and the externally supplied power is supplied, the supply of power generation fuel to the power generation section 20 is shut off on the basis of the control signal from the operation control section 70. In this case, the operation power supplied from the power supply control section 50 described later to the fuel supply control section 10 may be shut off.

(Power Generation Section)

Figure 4:
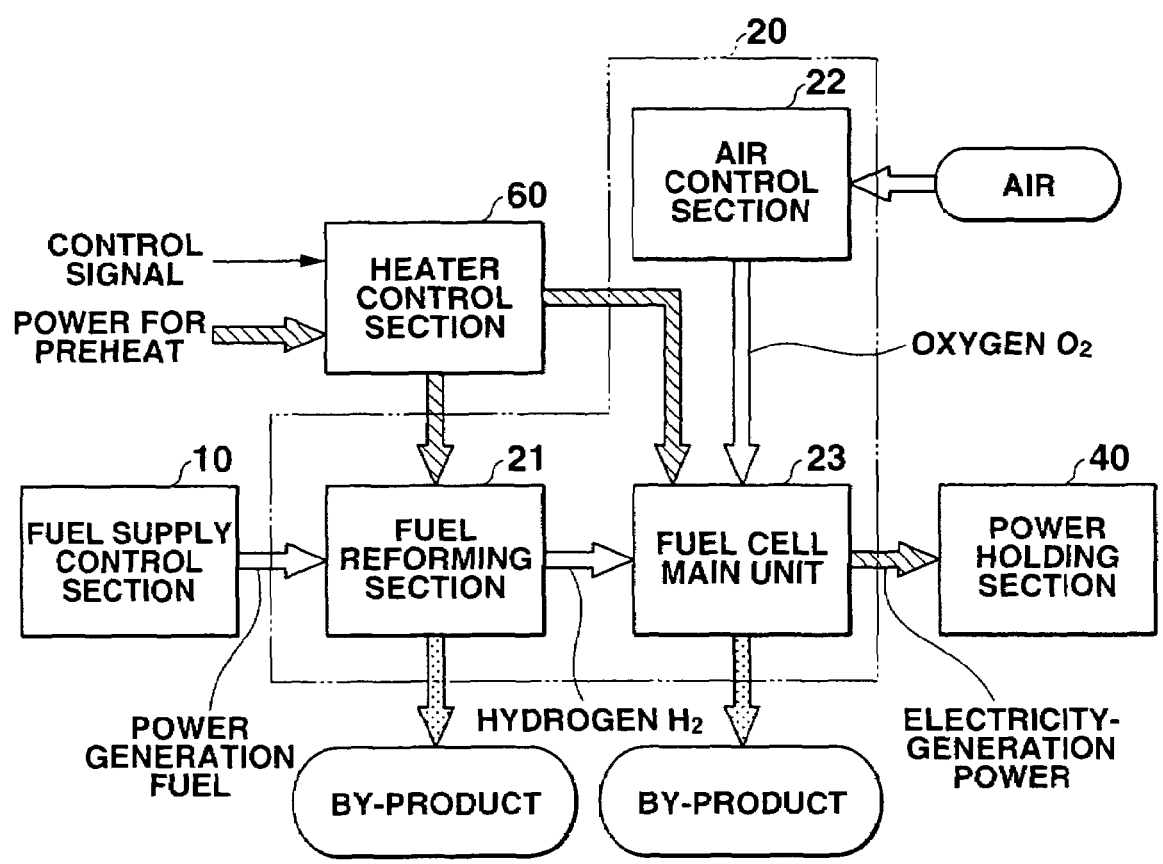
FIG. 4 is a block diagram showing a configuration of essential parts of a power generation section applied to the power supply system according to the present embodiment.

FIG. 4 is a block diagram showing a configuration of essential parts of the power generation section applied to the power supply system according to the present embodiment.

Figure 5:
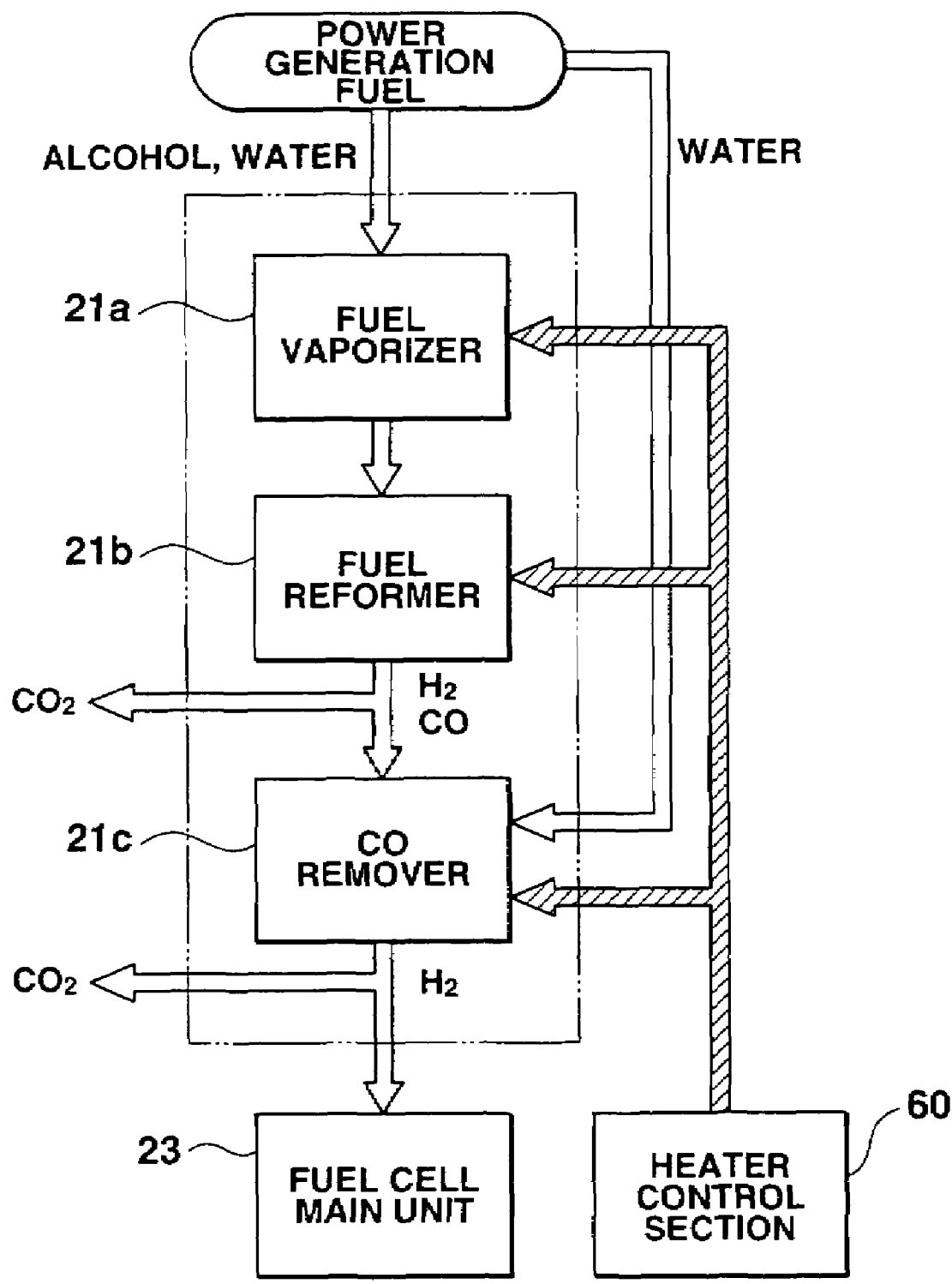
FIG. 5 is a block diagram showing one configuration example of a fuel reforming section applicable to the power generation section according to the present embodiment.

FIG. 5 is a block diagram showing one configuration example of a fuel reforming section applicable to the power generation section according to the present embodiment.

FIG. 6 is a schematic configuration diagram showing one configuration example of a fuel cell main unit applicable to the power generation section according to the present embodiment.

The power supply system to which a solid macromolecule type fuel cell adopting a fuel reforming method is applied will here be described.

As shown in FIG. 4, the power generation section 20 can apply a configuration roughly comprising a fuel reforming section 21 which causes a predetermined reforming reaction (catalyst reforming reaction) to the power generation fuel supplied via the fuel supply control section 10 to produce a particular fuel component (including hydrogen); an air control section 22 which takes in atmospheric air (including oxygen) from outside the power supply system; and a fuel cell main unit 23 which generates predetermined power (electricity-generation power) by an electrochemical reaction using the particular fuel component supplied from the fuel reforming section 21 and the air and the like supplied from the air control section 22. Their configurations will be described in greater detail.

(Fuel Reforming Section)

As shown in FIG. 5, the fuel reforming section 21 comprises, for example, a fuel vaporizer (fuel vaporizing section) 21a which vaporizes the power generation fuel (liquid fuel); a fuel reformer (fuel reforming section) 21b which produces hydrogen from the vaporized power generation fuel, and a small amount of carbon dioxide ($CO_2$), carbon monoxide (CO) and the like as by-products by a steam reforming reaction; and a CO remover (by-product removing section) 21c which removes the by-product (CO) produced by the fuel reformer 21b in an aqueous shift reaction or selective oxidative reaction.

Next, specific functions in the above parts constituting the fuel reforming section 21 will be described.

For example, when hydrogen gas ($H_2$) is produced by use of the power generation fuel (liquid fuel) comprising methanol ($CH_3OH$) and water ($H_2O$), methanol and water constituting the power generation fuel are individually vaporized or mixed liquids are collectively vaporized in an evaporation process in the fuel vaporizer 21a, thereby producing a gas of the power generation fuel. In this evaporation process, the power supplied via the heater control section 60 described later adjusts the temperature of a heater attached to the fuel vaporizer 21a, and the heater temperature is set to a temperature condition at about the boiling points of methanol and water in order to vaporize the power generation fuel.

Next, in a steam reforming reaction process in the fuel reformer 21b, the power supplied via the heater control section 60 adjusts the temperature of a heater attached to the fuel reformer 21b, and the heater temperature is set to a temperature condition at about 300° C. so that a heat energy of 49.4 kJ/mol is absorbed, thereby producing hydrogen ($H_2$) and a small amount of carbon dioxide ($CO_2$), as shown in the following chemical equation (1).

$$CH_3OH + H_2O \rightarrow 3H_2 + CO_2 \quad (1)$$

In this steam reforming reaction, a small amount of carbon monoxide (CO) may further be produced as a by-product in addition to hydrogen and carbon dioxide. Therefore, water (steam; $H_2O$) is reacted with carbon monoxide in an aqueous shift reaction process in the CO remover 21c so as to generate a heat energy of 40.2 kJ/mol, thereby producing carbon dioxide ($CO_2$) and hydrogen ($H_2$), as shown in the following chemical equation (2).

$$CO + H_2O \rightarrow CO_2 + H_2 \quad (2)$$

Furthermore, oxygen ($O_2$) is reacted with carbon monoxide which has not been converted into carbon dioxide and hydrogen in the aqueous shift reaction during a selective oxidative reaction process in the CO remover 21c so as to generate a heat energy of 283.5 kJ/mol, thereby producing carbon dioxide ($CO_2$), as shown in the following chemical equation (3).

$$CO + (1/2)O_2 \rightarrow CO_2 \quad (3)$$

Here, also in the aqueous shift reaction process and selective oxidative reaction process in the CO remover 21c, the power supplied via the heater control section 60 adjusts the temperature of a temperature adjustment mechanism (specifically, a heat sink, cooler or the like) attached to the CO remover 21c, to set a temperature condition corresponding to the generation of the heat energy. A small amount of carbon dioxide ($CO_2$) produced by these chemical reactions is discharged into the atmosphere.

In this way, the power generation fuel for an amount of hydrogen gas ($H_2$) necessary to generate predetermined power in a fuel cell main unit 23 is taken in from the fuel package 200 via the fuel supply control section 10, and reformed by the fuel reforming section 21, and thus a certain amount of hydrogen gas is supplied to the fuel cell main unit 23.

(Air Control Section)

The air control section 22 performs control to take in a necessary amount of oxygen gas ($O_2$) corresponding to electrochemical reactions (chemical equations (4) and (5) described later) in the fuel cell main unit 23 from the atmosphere to supply it to the fuel cell main unit 23.

Here, as long as the air control section 22 can supply the air corresponding to a maximum consumption amount of oxygen per unit of time in the fuel cell main unit 23, it may be configured so that the oxygen gas is always supplied to the fuel cell main unit 23 without controlling the supply and shutoff thereof.

In other words, the air control section 22 may be one in which a proceeding state of the electrochemical reaction in the power generation section 20 (fuel cell main unit 23) is controlled only by the supply amount of hydrogen gas adjusted in the fuel supply control section 10 and fuel reforming section 21 and by the supply amount of heat energy set by the heater control section 60, and, for example, vent holes or the like are provided instead of the air control section 22, so that a minimum amount of air (atmospheric air) used for the electrochemical reaction in the power generation section 20 is always supplied via the air holes.

(Fuel Cell Main Unit)

The fuel cell main unit 23 has a configuration of a known solid macromolecule type fuel cell main unit, and as shown in FIG. 6, schematically has a fuel electrode (cathode) ELc comprising a carbon electrode to which catalyst micro particles such as platinum, platinum-ruthenium or the like are stuck; an air electrode (anode) ELa comprising a carbon electrode to which catalyst micro particles such as platinum are stuck; and an ion conductive film (exchange film) FLi placed between the fuel electrode ELc ad the air electrode ELa. The fuel electrode ELc is supplied with hydrogen gas ($H_2$) extracted by the fuel reforming section 21, while the air electrode ELa is supplied with oxygen gas ($O_2$) in the atmosphere via the air control section 22. In this way, power is generated in accordance with the electrochemical reactions shown below, to produce the electricity-generation power. The electricity-generation power thus generated is, after being stored in the power holding section 40 described later, or directly, supplied to the power supply control section 50 (FIG. 3), and converted to a predetermined voltage in the power supply control section 50 to be supplied as power for internal operation for control of operation inside the power supply system, and also supplied as the drive power for driving the load (device DVC).

Regarding a power generation principle in the fuel cell main unit 23 constituting the power generation section 20, hydrogen gas ($H_2$) extracted via the fuel reforming section 21 is supplied to the fuel electrode ELc, whereby hydrogen ions (proton; $H^+$) from which electrons ($e^-$) are separated by the catalyst are produced as shown in the following equation (4), and pass to a side of the air electrode ELa via the ion conductive film FLi, and then the carbon electrode constituting the fuel electrode ELc takes out electrons ($e^-$) therefrom to generate power, which is supplied to the load (device DVC).

$$3H_2 \rightarrow 6H^+ + 6e^- \quad (4)$$

On the other hand, oxygen gas ($O_2$) in the atmosphere is supplied to the air electrode ELa via the air control section 22, whereby the catalyst reacts electrons ($e^-$) passed through the load, hydrogen ions ($H^+$) passed through the ion conductive film FLi and oxygen gas ($O_2$) in the atmosphere to produce water ($H_2O$), as shown in the following equation (5).

$$6H^+ + (3/2)O_2 + 6e^- \rightarrow 3H_2O \quad (5)$$

The series of electrochemical reactions described above (chemical equations (4) and (5)) proceed under an environment at a relatively low temperature of about room temperature to 80° C., and water ($H_2O$) is basically the only by-product except for electric power. Here, the heater temperature is adjusted by the power supplied via the heater control section 60 described later also in the fuel cell main unit 23, and thus a temperature conduction is set which enables the series of electrochemical reactions described above to satisfactorily proceed. It should be noted that the power (electricity-generation power) generated by the electrochemical reactions as described above is dependent upon the amount of hydrogen gas ($H_2$) substantially supplied to the fuel electrode ELc of the fuel cell main unit 23 and upon the temperature of the heater attached to the fuel cell main unit 23 as shown in the above chemical equations (4) and (5).

Here, for a heater structure to be provided in the fuel reforming section 21 and the fuel cell main unit 23, it is possible to apply such a configuration that, for example, thin film layers (thin film heater) made of a resistive element material having desired heat generation properties such as a metal oxide film or metal nitride film are individually formed in each reaction section of the fuel reforming section 21 and in the fuel cell main unit 23, by use of a thin film forming technique often used in a semiconductor manufacturing field.

It has been described in connection with the present embodiment that the liquid fuel comprising methanol and water is applied as the power generation fuel supplied from the fuel package 200, but the present invention is not limited to this, and an equivalent configuration may be satisfactorily applied at least with a liquid fuel or liquefied fuel including hydrogen elements or a gas fuel. More specifically, it is possible to satisfactorily apply alcoholic liquid fuels such as methanol, ethanol and butanol, liquefied fuels made of carbon hydride which is vaporized at ordinary temperature and at atmospheric pressure such as dimethyl ether, isobutane and natural gas (CNG), or a gas fuel such as a hydrogen gas.

When liquefied hydrogen or hydrogen gas is directly utilized as the power generation fuel and when a fuel cell of a fuel direct supply type is applied as the power generation section, the fuel reforming section 21 as shown in the configuration example described above is not needed, so that it is possible to apply such a configuration that directly supplies the power generation fuel to the fuel electrode ELc of the fuel cell main unit 23. In this case, the power for temperature adjustment supplied by the heater control section 60 is supplied only to the heater attached to the fuel cell main unit 23.

(Charge Control Section)

The charge control section 30 comprises detection means for detecting the connection state of the external power supply to the external power supply connection section 90, more particularly, the supply state of the externally supplied power from the external power supply, that is, whether or not the external power supply is connected to the external power supply connection section 90 and the externally supplied power is supplied from the external power supply, and the charge control section 30 sends a detection signal from the detection means to the operation control section 70, and in accordance with detection signal from the operation control section 70, the charge control section 30 performs control to take in the externally supplied power in a state where the externally supplied power is supplied, and to take in the electricity-generation power generated in the power generation section 20 in a state where the external power supply is not connected and supply of externally supplied power is shut off.

On the basis of the control signal from the operation control section 70, the charge control section 30 performs control to supply one of the externally supplied power and electricity generation power taken in to one of the power holding section 40 and the power supply control section 50, or to supply one of the externally supplied power and electricity generation power to the power supply control section 50 and supply at least one part of the power taken in to the power holding section 40 in accordance with a charging state of the power holding section 40 and a drive state of the load (device DVC).

(Power Holding Section)

FIGS. 7A to 7D are block diagrams showing one configuration example of the power holding section applied to the electric power generating part according to the present embodiment.

As shown in FIG. 7A, the power holding section 40 comprises a storage circuit 41 which stores (is charged with) and releases (discharges), for example, electric charges based on the externally supplied power supplied from the external power supply and the electricity-generation power supplied from the power generation section 20; a charging state detection circuit (voltage detection circuit) 42 which detects a storage state of the electric charges (held power) in the storage circuit 41; and a switch SW which performs ON/OFF actions in accordance with a detection signal SD output from the charging state detection circuit 42 and controls supply/shutoff of the power to the storage circuit 41.

The storage circuit 41 can specifically apply a circuit configuration in which, for example, a plurality of capacitors C1, C2 ..., Cn are serially connected.

In the power holding section 40 having such a configuration, the charging state detection circuit 42 always detects a charged voltage (or discharged voltage) based on the electric charges stored in the storage circuit 41, and the detection signal SD output to the switch SW is controlled in response to changes in the charged voltage. In other words, if the charged voltage of the storage circuit 41 is lower than a lower limit value in a reference voltage range predetermined in the charging state detection circuit 42, the switch SW is made to perform the ON action, and the externally supplied power or electricity-generation power supplied via the charge control section 30 is taken in, and then the capacitors C1, C2 ..., Cn constituting the storage circuit 41 are charged with electric charges based on this power, and on the other hand, if the charged voltage of the storage circuit 41 is higher than an upper limit value in the reference voltage range, the switch SW is made to perform the OFF action, and the power supply to the storage circuit 41 is shut off, and thus the charging operation of the storage circuit 41 is stopped.

In this way, the charged voltage in the power holding section 40 (storage circuit 41) is always monitored, thereby controlling the charging state of the storage circuit 41 so that the voltage always converges in the predetermined voltage range.

The configuration of the storage circuit 41 is not limited to the above-described circuit configuration in which a plurality of capacitors C1, C2 ..., Cn are serially connected, and the storage circuit 41 may be, for example, one that comprises only one capacitor as the storage circuit 41 if it can retain (be charge with) the electric charges based on the power supplied via the charge control section 30 and release (discharge) a voltage that is almost constant or varies in an optional voltage range.

In another configuration, as shown in FIG. 7B, the storage circuit 41 may comprise a plurality of electric double layer capacitors C1 to C4, and also comprises switches SWa1 to SWa6, SWb1 to SWb3 which switch connection states among the electric double layer capacitors, wherein each switch is made to perform ON/OFF actions with predetermined timing, and the electric double layer capacitors are controlled to switch between serial and parallel. The circuit with such a configuration turns the switches SWa1 to SWa6 off and turns the switches SWb1 to SWb3 on, so as to interconnect the electric double layer capacitors C1 to C4 in serial when the storage circuit 41 stores (is charged with) the electric charges, as shown in FIG. 7C. When releasing the electric charges (discharging electricity), the switches SWa1 to SWa6 are turned on and the switches SWb1 to SWb3 are turned off, thus controlling switch of the connection state, so as to interconnect the electric double layer capacitors C1 to C4 in parallel, as shown in FIG. 7D. This makes it possible to decrease an apparent capacity value to reduce a current value necessary for charging in the case of charging, and to increase the apparent capacity value to improve load driving capability in the case of discharging.

(Power Supply Control Section)

The power supply control section 50 has functions of: selectively taking in one of the power (externally supplied power, electricity generation power) directly supplied from the charge control section 30 and the power (charged power) based on the charges stored in the power holding section 40 in accordance with the control signal from the operation control section 70; performing a voltage conversion operation to convert the power to the power (drive power, internal operation power) having a constant voltage suitable for the operation in the load (device DVC) and the functional sections inside the power supply system (electric power generating part); and supplying the power to the functional sections inside the power supply system or to both the load (device DVC) and the functional sections. More specifically, the power supply control section 50 is constructed to have a function (voltage conversion function) as a DC-DC converter and a power supply control function.

In the power supply control section 50 as above, internal operation power is supplied to the functional sections inside the power supply system on the basis of the power (externally supplied power, electricity-generation power) directly supplied from the charge control section 30 or the power (charged power) based on the charge stored in the power holding section 40, regardless of the drive state of the load (device DVC), and when the functional sections inside the power supply system are operated and the load (device DVC) is activated, the drive power is controlled to be supplied to the load (device DVC) in addition to the internal operation power.

In this way, the power generation section 20 of the electric power generating part 100 is held in one of a power generating state and standby state depending on the drive state of the load (device DVC), and transition between both the states is rapidly carried out with a small amount of power, and moreover predetermined drive power is rapidly supplied depending on the drive state of the load (device DVC).

(Heater Control Section)

The heater control section 60 supplies temperature adjustment power to the reaction sections (fuel vaporizer 21a, fuel reformer 21b and CO remover 21c) in the fuel reforming section 21 of the power generation section 20 described above and the heater provided in the fuel cell main unit 23, on the basis of a control signal from the operation control section 70, thereby setting the temperature conditions to control the proceeding state of the chemical reactions shown in the above chemical equations (1) to (5).

Especially in a state where the power supply system is connected to the external power supply and the externally supplied power is supplied, predetermined power for preheat which is equal to or less than the power supplied during a normal power generation operation is supplied to the heater in accordance with the control signal from the operation control section 70, in order to control the temperature conditions set by the reaction sections of the fuel reforming section 21 and the heater attached to the fuel cell main unit 23 so that the temperature conditions reach the predetermined preheat temperature which is equal to or lower than the temperature for power generation operation, thus setting the power generation section 20 in the standby state.

The power for normal power generation operation is supplied to the heaters in accordance with the control signal from the operation control section 70 when the externally supplied power is shut off, but as the temperature condition has already been set to the preheat temperature, it is possible to set the temperature condition of the power generation section 20 to the power generation state with a small amount of power application so as to rapidly change the power generation section 20 from the standby state to the power generation operation state.

(Operation Control Section)

The operation control section 70 transmits individual control signals to the fuel supply control section 10, the power generation section 20, the charge control section 30, the power holding section 40, the power supply control section 50 and the heater control section 60 that have been described above to control their operation states on the basis of the supply state of the externally supplied power, the drive state of the device DVC and the detection signal from the remaining amount detection section 80 described later, thereby controlling generation and supply operations of the drive power in the electric power generating part 100. The specific operation in the operation control section 70 will be described later in detail.

Figure 12:
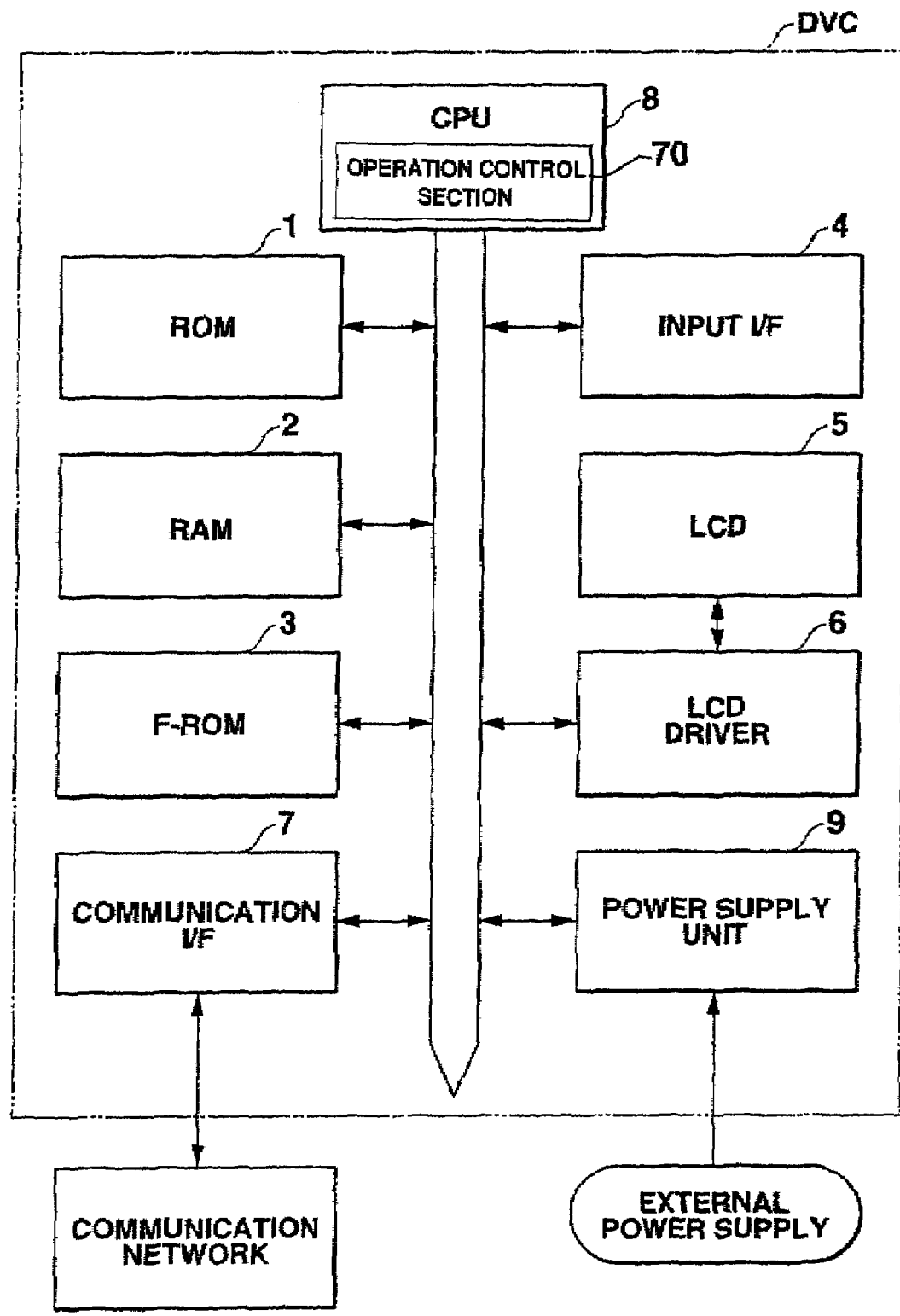
FIG. 12 is a schematic block diagram showing an internal configuration of the electronic device according to an embodiment of the present invention.

FIG. 3 shows a configuration in which the operation control section 70 is provided inside the power supply system (electric power generating part 100) that constitutes the power supply unit, but the present invention is not limited thereto. Alternatively, as shown in FIG. 12, the function of the operation control section 70 may be added to the CPU 8 which controls all the functional sections of the device DVC shown in FIG. 2.

(Remaining Amount Detection Section)

The remaining amount detection section 80 detects the remaining amount of power generation fuel sealed in the fuel package 200, and transmits the detection signal to the operation control section 70. In this way, when the remaining amount of power generation fuel is small or when no amount remains, for example, the operation control section 70 displays information on the remaining amount of power generation fuel, information on power supply in the power supply unit and the like via the display output means (such as LCD) of the device DVC, thereby letting a user of the device DVC or the like know that appropriate measures such as connection to the external power supply and supply of power generation fuel should be taken.

When the device DVC comprises a known battery remaining amount informing function often used in existing portable electronic devices or the like, that is, a function of indicating a battery remaining amount and drivable time on the basis of a change (decrease) in the output voltage from the battery or power supply unit, the operation control section 70 may control the power supply control section 50 in accordance with a detection signal from the remaining amount detection section 80 to simulate output voltage characteristics of the battery or power supply unit. In that case, for example, the voltage related to the drive power may be controlled so that it gradually changes (decreases).

(Fuel Package)

The fuel package 200 applied to the power supply system according to the present invention is a fuel storing container with high sealing performance in which the power generation fuel comprising the liquid fuel or liquefied fuel containing hydrogen or the gas fuel is filled and sealed, as described above, and the fuel package 200 has a configuration combined detachably from or integrally with the electric power generating part 100 via the I/F section 300, as shown in FIG. 3. Here, the power generation fuel sealed in the fuel package 200 is taken into the electric power generating part 100 via the fuel sending path provided in the I/F section 300 described later, and the above described fuel supply control section 10 supplies the power generation section 20 with a necessary amount of power generation fuel for generating the power having a predetermined voltage as needed.

(I/F Section)

The I/F section 300 applied to the power supply system according to the present invention at least physically combines the electric power generating part 100 with the fuel package 200, and supplies the power generation fuel sealed in the fuel package 200 to the electric power generating part 100 via the fuel sending path.

<Drive Control Method of Power Supply System>

Next, the drive control operation in the device in which the power supply system having the above-described configuration is applied to the power supply unit will be described with reference to the drawings.

FIRST EXAMPLE

Figure 8:
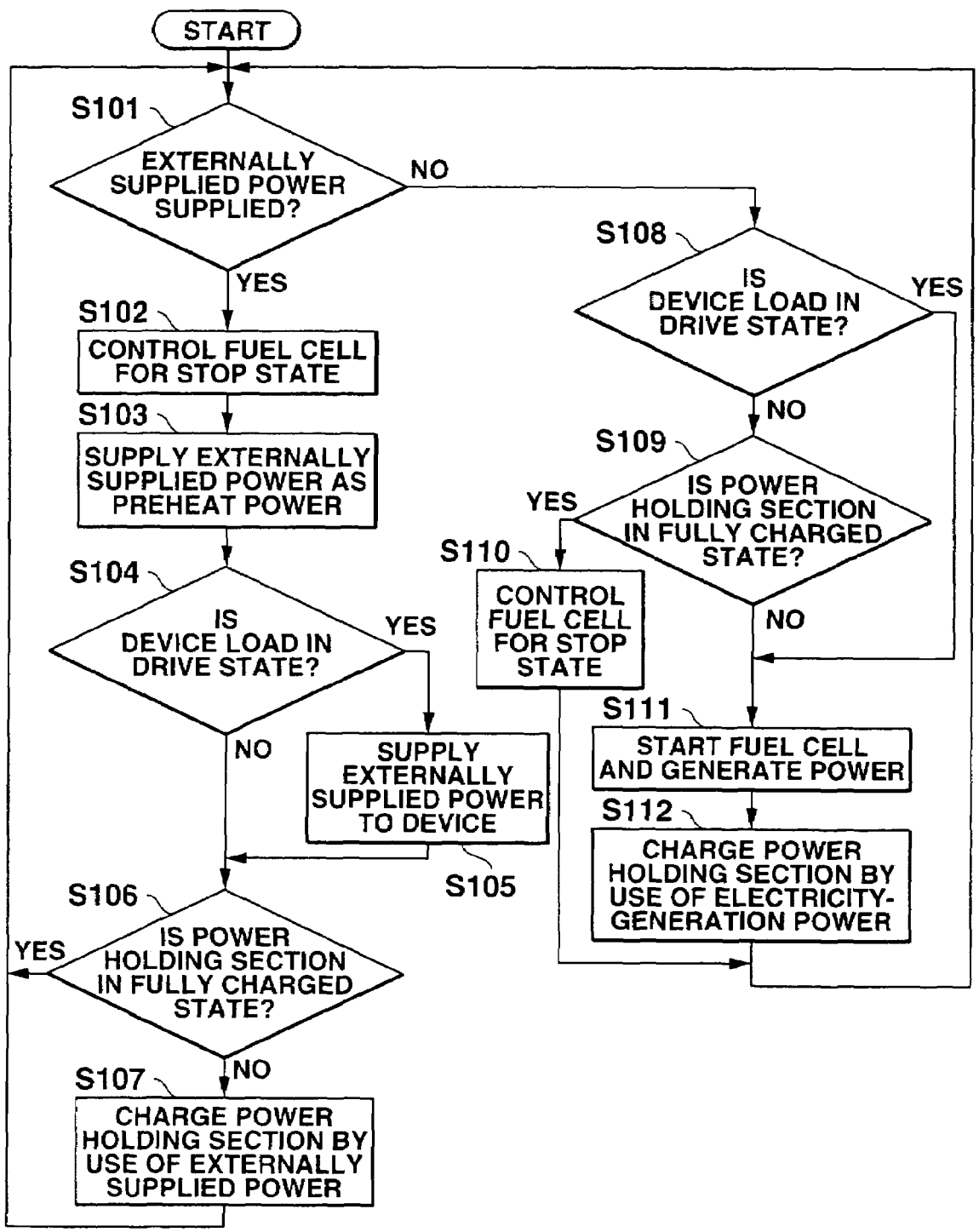
FIG. 8 is a flowchart showing a first example of an entire operation of the power supply system according to the present embodiment.
Figure 9:
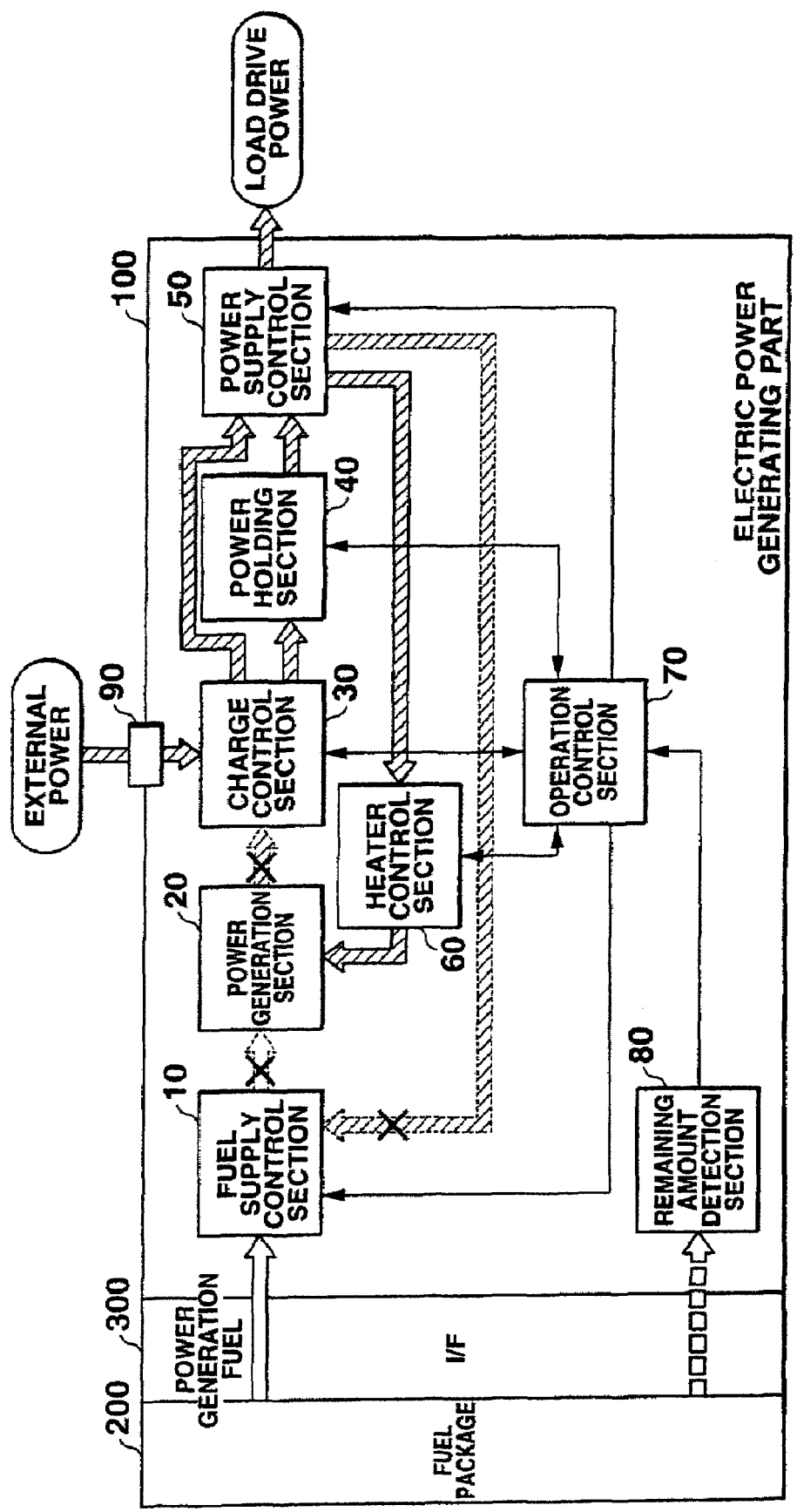
FIG. 9 is a control conceptual view showing an operation where an external power supply is connected and externally supplied power is supplied in the power supply system according to the present embodiment.
Figure 10:
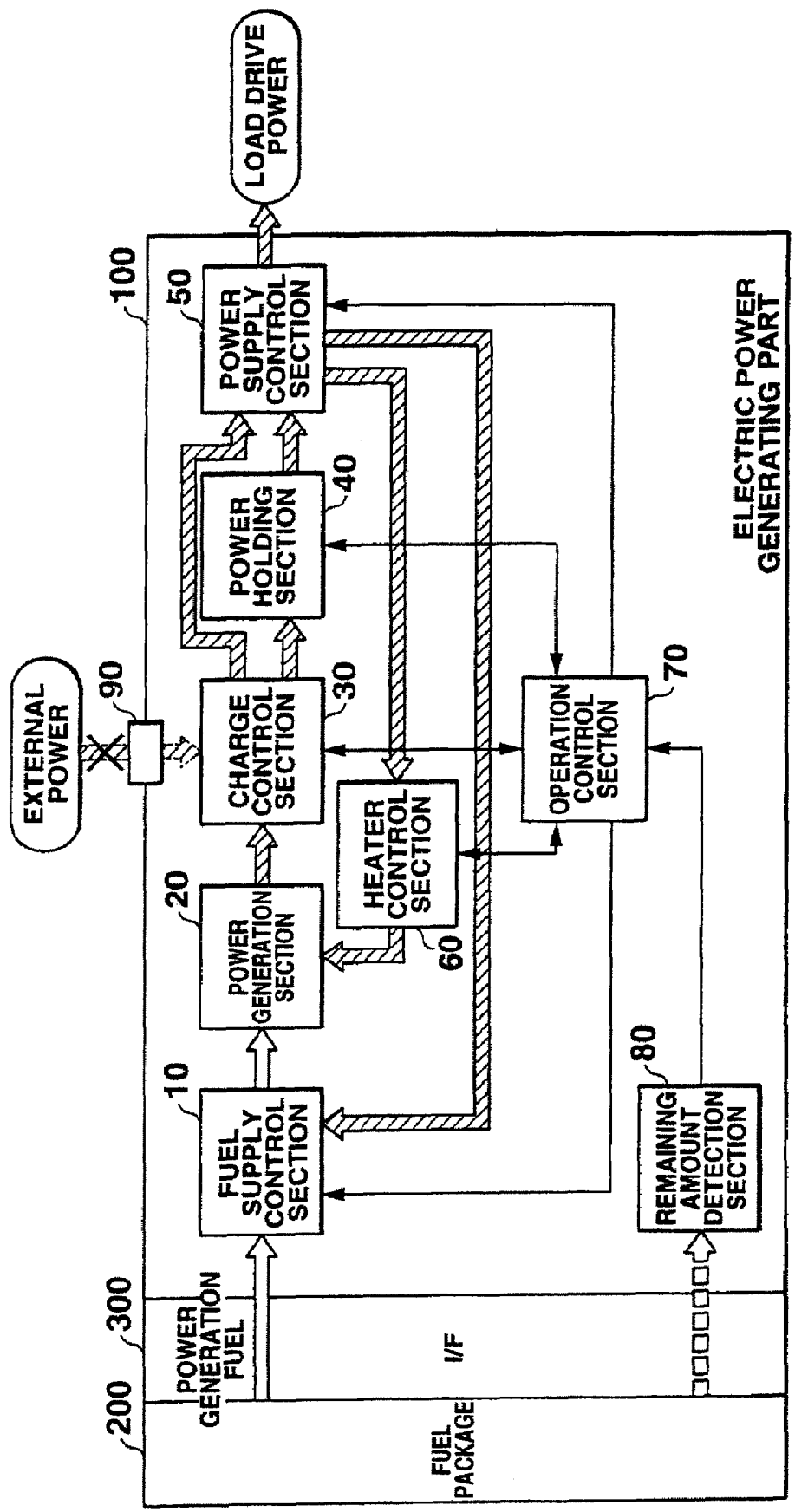
FIG. 10 is a control conceptual view showing an operation where the external power supply is not connected and the externally supplied power is not supplied in the power supply system according to the present embodiment.

FIG. 8 is a flowchart showing a first example of an entire operation of the power supply system according to the present embodiment. FIG. 9 is a control conceptual view showing an operation where an external power supply is connected and externally supplied power is supplied in the power supply system according to the present embodiment, and FIG. 10 is a control conceptual view showing an operation where the external power supply is not connected and the externally supplied power is not supplied in the power supply system according to the present embodiment.

A series of drive control operations shown below is controlled by the functional sections provided in the electric power generating part 100 of the power supply system described above and by the operation control section 70.

In the drive control operations in the power supply system according to the present example, as shown in FIG. 8, the external power supply is first connected to the power supply system (electric power generating part 100) via the external power supply connection section 90, and it is judged via the charge control section 30 whether or not the externally supplied power is supplied (S101). This method of judging whether or not the externally supplied power is supplied is not specifically limited, but this, for example, may be based on a mechanical operation in which the external power supply is plugged into the connector constituting the external power supply connection section 90, and may be a method in which the supply of a current or voltage to the external power supply connection section 90 is detected, and other methods may likewise be adopted.

When the external power supply is connected to the power supply system and the externally supplied power is supplied via the charge control section 30, the operation control section 70 controls the charge control section 30 so that the externally supplied power is supplied to the power holding section 40 or the power supply control section 50, and controls the fuel supply control section 10 to shut off the supply of power generation fuel to the power generation section 20, thereby controlling and stopping the power generation operation in the power generation section 20 (fuel cell main unit 23) (S102).

At the same time, the operation control section 70 controls the power supply control section 50 and the heater control section 60, and converts at least part of the externally supplied power supplied via the charge control section 30 to power having a predetermined direct current voltage, so as to supply it as the power for preheat to the power generation section 20 (S103). In this way, the heaters attached to the reaction sections of the fuel reforming section 21 constituting the power generation section 20 and the fuel cell main unit 23 are heated and thus a predetermined preheat temperature approximate to the temperature condition for the power generation operation is set and held, while the supply of power generation fuel is shut off by the fuel supply control section 10, so that the power generation operation is stopped and the power generation section 20 is set on standby.

Also at the same time, the operation control section 70 judges whether or not the load (device DVC) is in a driving state (S104), and when the load (device DVC) is in a driving state, controls the power supply control section 50, and converts the remaining externally supplied power to power having a predetermined direct current voltage so as to supply it as the drive power to the load (device DVC) (S105). On the other hand, when the load (device DVC) is in a stop state, the supply of drive power to the load (device DVC) is shut off.

Next, the operation control section 70 judges whether or not the power holding section 40 is in a fully charged state (S106). More specifically, the operation control section 70 detects a charged voltage in the power holding section 40, and when the charged voltage is above a predetermined reference voltage, judges that it is in the fully charged state, and then supplies the externally supplied voltage supplied by the charge control section 30 directly to the power supply control section 50 without supplying it to the power holding section 40. On the other hand, when the charged voltage in the power holding section 40 is below the predetermined reference voltage, the operation control section 70 judges that the power holding section 40 is not in the fully charged state, has used up the charged power and needs to be charged, thus supplying part of the externally supplied power supplied by the charge control section 30 to the power holding section 40 to carry out charging operation (S107) while supplying the remaining externally supplied power directly to the power supply control section 50.

Next, when the external power supply is not connected to the power supply system and the externally supplied power is not supplied thereto in the processing step S101 described above, or when the external power supply is removed and the supply of externally supplied power is shut off, as shown in FIG. 10, the operation control section 70 judges whether or not the load (device DVC) is in a driving state similarly to the processing step S104 described above (S108), and shuts off the supply of drive power to the device DVC when the load (device DVC) is in a stop state.

Next, the operation control section 70 judges whether or not the power holding section 40 is in the fully charged state (S109) similarly to the processing step S106 described above, and when it is in the fully charged state, controls the fuel supply control section 10, and shuts off the supply of power generation fuel to the power generation section 20, thereby controlling and stopping the power generation operation in the fuel cell main unit 23 of the power generation section 20 (S110) similarly to the processing step S102.

On the other hand, when the load (device DVC) is in a driving state in the processing step S108 described above and when the power holding section 40 is not in the fully charged state and has used up the charged power in the processing step S109 described above, the operation control section 70 controls the fuel supply control section 10 to supply the power generation fuel to the power generation section 20, and also controls the power supply control section 50 and the heater control section 60 to take the charged power into the power holding section 40, and then converts the power to power having a predetermined direct current voltage so as to supply it as the power for power generation to the power generation section 20. In this way, the heaters attached to the reaction sections of the fuel reforming section 21 constituting the power generation section 20 and the fuel cell main unit 23 are set to a predetermined temperature state adapted to the temperature condition for power generation operation, and a predetermined amount of power generation fuel is supplied by the fuel supply control section 10 to start the power generation operation (S111), thereby changing the power generation section 20 from the standby state to the power generating state.

The electricity-generation power produced in the power generation section 20 is supplied to the power holding section 40 via the charge control section 30 and a charging operation is executed (S112), and when the load (device DVC) is in a driving state, drive power having a predetermined direct current voltage is generated and supplied to the load (device DVC) on the basis of the power with which the power holding section 40 is charged or the electricity-generation power.

In other words, in accordance with the drive control operations in the power supply system as described above, if the external power supply is connected to the power supply system and the externally supplied power is supplied in a state where the supply of externally supplied power is shut off, the power generation section performs the power generation operation by use of the power generation fuel supplied from the fuel package, and the load (device DVC) is driven by the drive power supplied on the basis of the electricity-generation power thereof, the supply of power generation fuel to the power generation section is shut off to stop the power generation operation of the fuel cell main unit, and then the drive power is generated and supplied on the basis of the externally supplied power so as to maintain the driving state of the device DVC. In other words, the power supply which supplies the drive power to the device DVC is controlled to switch from the fuel cell to the external power supply.

In a state where the external power supply is connected to the power supply system and the externally supplied power is supplied, at least part of the externally supplied power is supplied to the power holding section to execute the charging operation, and the power holding section is controlled so that it will be in a fully charged state, while part of the externally supplied power is supplied as the power for preheat to the heater attached to the power generation section to hold it in a preheated state, and the power generation section is maintained in a standby state.

In this case, part of the externally supplied power puts the heater in the preheated state and is consumed by being supplied to charge the power holding section, but application of a power supply such as the commercial alternating current power supply or external battery whose power supplying capability is high and adequate as the external power supply serves to prevent the driving state in the device DVC and operation of the power supply system from being affected.

Next, in a state where the external power supply is connected to the power supply system and the load (device DVC) is driven by the externally supplied power as described above, if the external power supply is removed from the power supply system and the supply of externally supplied power is shut off, the power for power generation is supplied to the heater attached to the power generation section to set a predetermined temperature condition on the basis of the power derived from the externally supplied power with which the power holding section is charged, and the power generation fuel is supplied to the power generation section. Thus, the power generation section restarts the power generation operation and moves from a standby state to a power generation state.

At this point, in the standby state where the external power supply is connected to the power supply system, the power generation section is set to a preheat temperature approximate to the temperature condition for the power generation operation because the power for preheat based on the externally supplied power is supplied to the heater, and thus only a small amount of power is sufficient which must be supplied from the power holding section in order to heat the heater to the temperature condition necessary at the time of power generation, thereby making it possible to reduce power consumption and fuel consumption necessary for starting. Also, starting time to reach this temperature condition can be drastically reduced.

In this way, even if start and stop operations are relatively frequently performed in the electronic devices such as notebook-sized personal computers, PDAs and digital cameras that are driven by appropriately and selectively using the power supplied from the external power supply and the power with which the battery or the like built in the electronic devices is charged, the power generation section is placed in the standby state while it is using the external power supply by applying the power supply system according to the present invention as the power supply unit, so that it rarely happens that starting can not be achieved when the power generation operation in the fuel cell main unit is started by use of the power with which the power holding section is charged, and use of the electronic device can be made easier, and moreover, the power holding section is charged with the externally supplied power when it is using the externally supplied power, and this held power is used when the power generation section is started, thereby enabling a reduction in the consumption of power generation fuel and improvement in fuel consumption efficiency.

SECOND EXAMPLE

Figure 11:
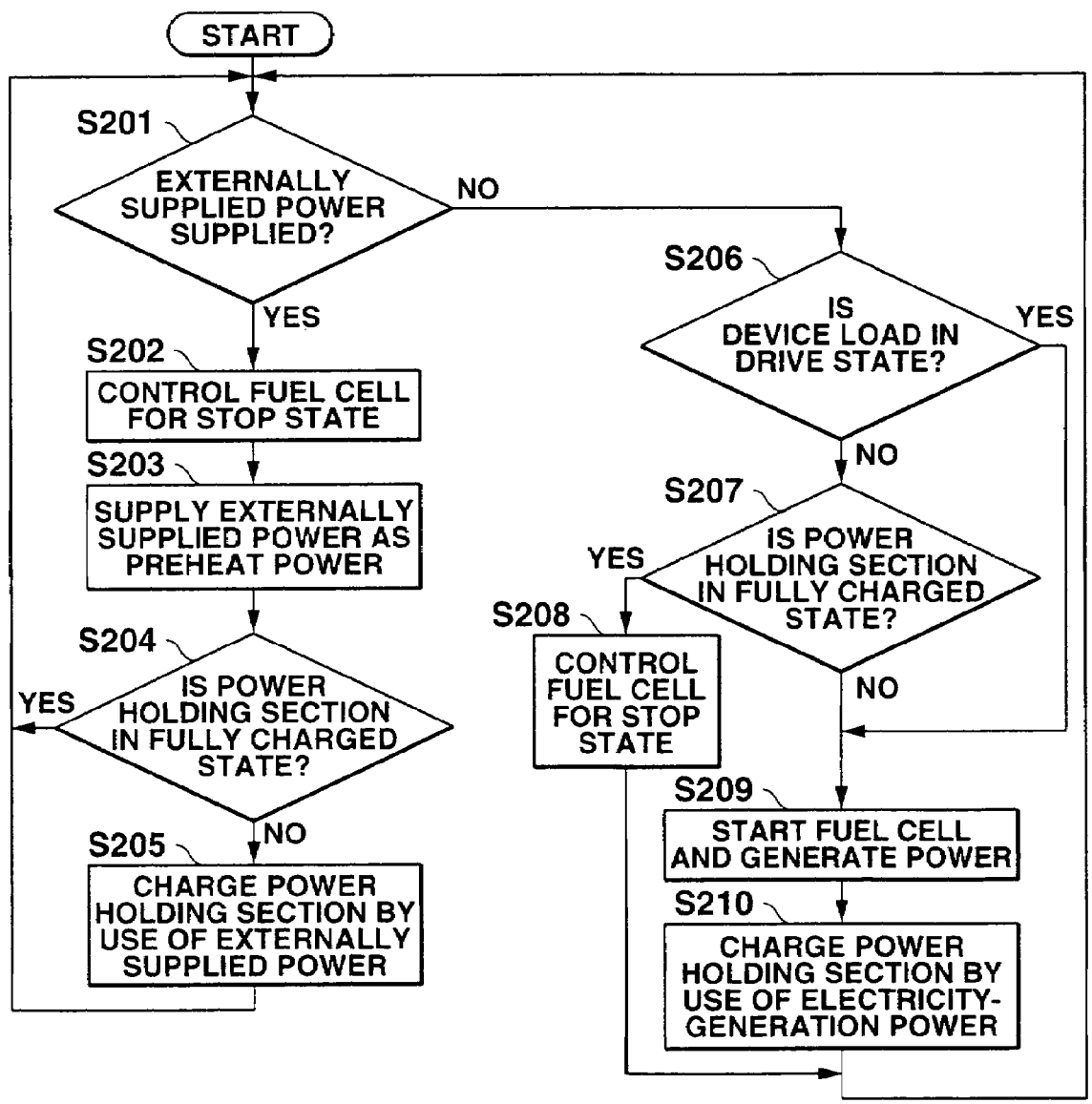
FIG. 11 is a flowchart showing a second example of the entire operation of the power supply system according to the present embodiment.

FIG. 11 is a flowchart showing a second example of the entire operation of the power supply system according to the present embodiment. It is to be noted that description is simplified for the same procedure as in the above-described example.

In the drive control operation in the power supply system according to the present example, as shown in FIG. 11, the external power supply is first connected to the power supply system, and it is judged whether or not the externally supplied power is supplied (S201).

When the external power supply is connected to the power supply system and the externally supplied power is supplied via the charge control section 30, the operation control section 70 controls the fuel supply control section 10 so as to shut off the supply of power generation fuel to the power generation section 20, thereby controlling and stopping the power generation operation in the fuel cell main unit 23 (S202). At the same time, the operation control section 70 controls the power supply control section 50 and the heater control section 60, and supplies part of the externally supplied power as the power for preheat to the power generation section 20 (S203), thereby setting the power generation section 20 in a standby state.

Next, the operation control section 70 detects and judges the charging state of the power holding section 40 (S204), and when it is in a fully charged state, the externally supplied power is supplied directly to the power supply control section 50 without being supplied to the power holding section 40. On the other hand, when the power holding section 40 is not in the fully charged state and has used up the charged power, part of the externally supplied power is supplied to the power holding section 40 to perform a charging operation (S205), while the remaining externally supplied power is directly supplied to the power supply control section 50.

Furthermore, when the external power supply is not connected to the power supply system and the externally supplied power is not supplied thereto in the processing step S201 described above, the operation control section 70 judges whether or not the load (device DVC) is in a driving state (S206), and shuts off the supply of drive power to the device DVC if the device DVC is in a stop state.

Next, the operation control section 70 judges whether or not the power holding section 40 is in the fully charged state (S207), and when it is in the fully charged state, controls and stops the power generation operation in the fuel cell main unit 23 (S208).

On the other hand, when the device DVC is in a driving state in the processing step S206 described above and when the power holding section 40 is not in the fully charged state and has used up the charged power in the processing step S207, the power generation fuel is supplied to the power generation section 20, and also the power with which the power holding section 40 is charged is supplied as the power for power generation to the power generation section 20. In this way, the reaction sections of the fuel reforming section 21 constituting the power generation section 20 and the fuel cell main unit 23 are set to a predetermined temperature state adapted to the temperature condition for power generation operation, and a predetermined amount of power generation fuel is supplied to start the power generation operation (S209), thereby moving the power generation section 20 from the standby state to the power generating state.

The electricity-generation power produced in the power generation section 20 is supplied to the power holding section 40 and a charging operation is executed (S210), and when the load (device DVC) is in a driving state, the power with which the power holding section 40 is charged or the drive power based on the electricity-generation power is supplied to the load (device DVC).

In other words, the drive control operation in the present embodiment is characterized in that it is performed regardless of the driving state of the load (device DVC) especially in a state where the external power supply is connected to the power supply system and the externally supplied power is supplied. Since part of the externally supplied power is supplied as the power for preheat to the heater attached to the power generation section to hold it in a preheated state and the power generation section is maintained in the standby state in a state where the external power supply is connected to the power supply system and the externally supplied power is supplied, only a small amount of power is sufficient which must be supplied in order to heat the heater to the temperature condition required at the time of power generation operation, and the power consumption and fuel consumption necessary for starting can be reduced in such a type of usage where the power generation section is started to drive the device DVC immediately after the supply of externally supplied power is shut off.

In the embodiment described above, the portable devices such as notebook-sized personal computers, and PDAs are illustrated as examples of the electronic devices to which the power supply system and its drive control method according to the present invention are applied, but the present invention is not limited thereto, and the present invention can be suitably applied to other electronic devices and power devices as long as such electronic devices comprise power holding means therein, and also comprise a load which is driven even by the power supplied from the external power supply wherein the load is started and stopped relatively frequently.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A power supply system for generating drive power and supplying the drive power to a load, comprising:
   a power generation section that includes: (a) a fuel reforming section to which a power generation fuel is supplied, wherein the fuel reforming section is set at a predetermined temperature and produces a particular fuel component including hydrogen from the power generation fuel, and (b) a fuel cell which generates electricity-generation power using the particular fuel component;
   an external power supply connection section for connecting to an external power supply which supplies externally supplied power;
   a fuel supply control section which controls supply and shut off of supply of the power generation fuel to the power generation section; and
   an operation control section which (a) directs the fuel supply control section to shut off the supply of the power generation fuel to the power generation section, so as to stop the power generation by the fuel cell and set the power generation section in a standby state in which the fuel reforming section is set at one of the predetermined temperature and a lower preheat temperature using the externally supplied power supplied from the external power supply when the external power supply is connected to the external power supply connection section, and (b) directs the fuel supply control section to start supply of the power generation fuel to the power generation section, so as to start the power generation by the fuel cell and set the fuel reforming section to the predetermined temperature using at least part of the electricity-generation power when the connection of the external power supply to the external power supply connection section is released.

2. The power supply system according to claim 1, further comprising a power supply control section which includes means for controlling the generated drive power and supplying the drive power to the load based on one of the electricity-generation power generated by the power generation section and the externally supplied power.

3. The power supply system according to claim 2, wherein the power supply control section supplies the drive power based on the externally supplied power, when the external power supply is connected to the external power supply connection section and the externally supplied power is supplied from the external power supply.

4. The power supply system according to claim 2, further comprising a power holding section which holds electric charges based on the electricity-generation power generated by the power generation section and the externally supplied power, and which releases the held electric charges as power for generating the drive power to the power supply control section.

5. The power supply system according to claim 4, wherein the external power supply comprises a power supply which has a power supply wattage higher than a power supply wattage of the power holding section.

6. The power supply system according to claim 4, wherein the power holding section comprises a plurality of capacity elements.

7. The power supply system according to claim 6, wherein the power holding section comprises a controller to: (I) interconnect the plurality of capacity elements in series in a charging state where the electric charges are held in the power holding section, and (ii) interconnect the plurality of capacity elements in parallel in a discharging state where the power based on the held electric charges in the power holding section is released.

8. The power supply system according to claim 4, further comprising means for supplying at least part of the externally supplied power to the power holding section, when the external power supply is connected to the external power supply connection section and the externally supplied power is supplied from the external power supply.

9. The power supply system according to claim 4, further comprising means for supplying at least part of the electricity-generation power generated by the power generation section to the power holding section when the external power supply is not connected to the external power supply connection section.

10. The power supply system according to claim 4, further comprising a charge control section which performs control to take in the externally supplied power and the electricity-generation power and to supply the externally supplied power and the electricity-generation power to the power holding section and the power supply control section, based on a supply state of the externally supplied power from the external power supply.

11. The power supply system according to claim 10, wherein the charge control section comprises detection means for detecting that the external power supply is connected to the external power supply connection section.

12. The power supply system according to claim 11, wherein the charge control section comprises means for selecting one of the electricity-generation power and the externally supplied power to supply to the power holding section and the power supply control section, based on a detection result by the detection means.

13. The power supply system according to claim 1, wherein the external power supply has a commercial alternating current power supply, and power which is supplied from the commercial alternating current power supply and converted to a direct current is supplied as the externally supplied power.

14. The power supply system according to claim 1, wherein the operation control section is provided in an electronic device main unit which has the load driven by the drive power.

15. The power supply system according to claim 1 which further comprises: a fuel package which seals the power generation fuel.

16. The power supply system according to claim 15 which further comprises:
an interface section which is adapted to detachably attach the fuel package to the power generation section, and
means for supplying the power generation fuel sealed in the fuel package to the power generation section.

17. An electronic device comprising:
(i) an electric power generating part which generates drive power, and which comprises:
a power generation section which includes: (a) a fuel reforming section to which a power generation fuel is supplied, wherein the fuel reforming section is set at a predetermined temperature and produces a particular fuel component including hydrogen from the power generation fuel, and (b) a fuel cell which generates electricity-generation power using the particular fuel component;
an external power supply connection section for connecting to an external power supply which supplies externally supplied power;
a fuel supply control section which controls supply and shut off of supply of the power generation fuel to the power generation section; and
an operation control section which (a) directs the fuel supply control section to shut off the supply of the power generation fuel to the power generation section, so as to stop the power generation by the fuel cell and set the power generation section in a standby state in which the fuel reforming section is set at one of the predetermined temperature and a lower preheat temperature using the externally supplied power supplied from the external power supply when the external power supply is connected to the external power supply connection section, and (b) directs the fuel supply control section to start supply of the power generation fuel to the power generation section, so as to start the power generation by the fuel cell and set the fuel reforming section to the predetermined temperature using at least part of the electricity-generation power when the connection of the external power supply to the external power supply connection section is released;
(ii) a fuel package in which the power generation fuel is sealed; and
(iii) an electronic device main unit which has a load which is driven by the drive power,
wherein the fuel package is removably attached to the electric power generating part.

18. The electronic device according to claim 17, wherein the operation control section is provided in the electronic device main unit.

19. The electronic device according to claim 18, wherein the operation control section further serves as a load drive control section which controls at least a driving state of the load.

20. The electronic device according to claim 17, wherein the electric power generating part is configured integrally with the electronic device.

21. The electronic device according to claim 17 which further comprises:
an interface section which is adapted to detachably attach the fuel package to the electric power generating part, and
means for supplying the power generation fuel sealed in the fuel package to the electric power generating part.

22. The electronic device according to claim 17, wherein the electric power generating part further comprises a power supply control section which includes means for controlling the generated drive power and supplying the drive power to the load based on one of the electricity-generation power generated by the power generation section and the externally supplied power.

23. The electronic device according to claim 22, wherein the power supply control section supplies the drive power based on the externally supplied power when the external power supply is connected to the external power supply connection section and the externally supplied power is supplied from the external power supply.

24. The electronic device according to claim 22, wherein the electric power generating part further comprises a power holding section which holds electric charges based on the electricity-generation power generated by the power generation section and the externally supplied power, and which releases the held electric charges as power for generating the drive power to the power supply control section.

25. The electronic device according to claim 24, wherein the power holding section comprises a plurality of capacity elements.

26. The electronic device according to claim 24, wherein the electric power generating part comprises means for supplying at least part of the externally supplied power to the power holding section when the external power supply is connected to the external power supply connection section and the externally supplied power is supplied from the external power supply.

27. The electronic device according to claim 24, wherein the electric power generating part comprises means for supplying at least part of the electricity-generation power generated by the power generation section to the power holding section when the external power supply is not connected to the external power supply connection section.

28. The electronic device according to claim 24, wherein the electric power generating part further comprises a charge control section which performs control to take in the externally supplied power and the electricity-generation power to supply the externally supplied power and the electricity-generation power to the power holding section and the power supply control section, based on a supply state of the externally supplied power from the external power supply.

29. The electronic device according to claim 28, wherein the charge control section comprises detection means for detecting that the external power supply is connected to the external power supply connection section.

30. The electronic device according to claim 29, wherein the charge control section comprises means for selecting one of the electricity-generation power and the externally supplied power to supply to the power holding section and the power supply control section based on a detection result by the detection means.

31. The electronic device according to claim 17, wherein the external power supply is a commercial alternating current power supply, and power which is supplied from the commercial alternating current power supply and converted to a direct current is supplied as the externally supplied power.

32. The electronic device according to claim 17, wherein the electric power generating part comprises a remaining amount detection section which detects a remaining amount of the power generation fuel sealed in the fuel package.

33. A method for drive control of a power supply system which supplies drive power to a load, the power supply system comprising: (i) a power generation section which includes: (a) a fuel reforming section to which a power generation fuel is supplied, wherein the fuel reforming section is set at a predetermined temperature and produces a particular fuel component including hydrogen from the power generation fuel, and (b) a fuel cell which generates electricity-generation power using the particular fuel component, and (ii) an external power supply connection section for connecting to an external power supply, the method comprising:
generating and supplying the drive power based on the electricity-generation power generated by the power generation section when the external power supply is not connected to the external power supply connection section; and
shutting off the supply of the power generation fuel to the power generation section to set at least the power generation section in a standby state when the external power supply is connected to the external power supply connection section and externally supplied power is supplied from the external power supply, wherein the fuel reforming section is set at one of the predetermined temperature and a lower preheat temperature in the standby state, thereby stopping the power generation by the fuel cell; and
starting the supply of the power generation fuel to the power generation section to start the power generation by the fuel cell and thus to set the fuel reforming section to the predetermined temperature using at least part of the electricity-generation power when connection of the external power supply to the external power supply connection section is released.

34. The method for drive control of the power supply system according to claim 33, wherein the power supply system further comprises a power holding section which is charged with and discharges power; and wherein when the external power supply is connected to the external power supply connection section and the externally supplied power is supplied from the external power supply, the power holding section is charged using the externally supplied power.

35. The method for drive control of the power supply system according to claim 33, wherein the power supply system further comprises a power holding section which is charged with and discharges power; and wherein when the external power supply is not connected to the external power supply connection section, the power holding section is charged using the electricity-generation power.

36. The method for drive control of the power supply system according to claim 33, wherein when the external power supply is connected to the external power supply connection section and the externally supplied power is supplied from the external power supply, the drive power is supplied based on the externally supplied power.

* * * * *